United States Patent
Eyal

(10) Patent No.: US 8,096,295 B1
(45) Date of Patent: Jan. 17, 2012

(54) SOLAR PANEL HAVING POLYCARBONATE SHEET COVERING

(76) Inventor: Victor A. Eyal, Longwood, FL (US)

( * ) Notice: Subject to any disclaimer, the term of this patent is extended or adjusted under 35 U.S.C. 154(b) by 276 days.

(21) Appl. No.: 11/845,929

(22) Filed: Aug. 28, 2007

(51) Int. Cl.
*F24J 2/30* (2006.01)

(52) U.S. Cl. ........ 126/643; 126/569; 126/612; 126/624; 126/653; 126/669; 165/171; 165/173; 165/905

(58) Field of Classification Search ................. 126/643, 126/569, 612, 624, 653, 651, 669, 704, 905, 126/663; 165/173, 171, 905; 285/915; 138/174; 264/129

See application file for complete search history.

(56) References Cited

U.S. PATENT DOCUMENTS

| | | | | |
|---|---|---|---|---|
| 4,125,108 A | * | 11/1978 | Porter et al. | 126/662 |
| 4,263,896 A | * | 4/1981 | Zebuhr | 126/623 |
| 4,279,244 A | * | 7/1981 | McAlister | 126/621 |
| 4,410,757 A | * | 10/1983 | Stamminger et al. | 136/248 |
| 4,607,616 A | * | 8/1986 | Lehmann | 126/669 |
| 4,867,133 A | * | 9/1989 | Sadler | 126/663 |
| 5,572,987 A | * | 11/1996 | Moratalla et al. | 126/652 |
| 6,487,768 B2 | * | 12/2002 | Rhodes | 29/564.8 |
| 7,089,706 B2 | | 8/2006 | Ceria | |
| 2004/0255932 A1 | | 12/2004 | Nocera | |

* cited by examiner

*Primary Examiner* — Steven B McAllister
*Assistant Examiner* — Avinash Savani
(74) *Attorney, Agent, or Firm* — Ronald E. Smith; Smith & Hopen, P.A.

(57) ABSTRACT

A solar panel includes an inlet manifold, an outlet manifold spaced apart from the inlet manifold, and a plurality of pipes having a first end in open fluid communication with the inlet manifold and a second end in open fluid communication with the outlet manifold. A box-shaped cover formed of a polycarbonate material is disposed in ensleeving relation to the plurality of pipes. The box-shaped cover has a length at least slightly less than the distance between the inlet and outlet manifolds so that opposite ends of pipes in the plurality of pipes are exposed to ambient. The cover substantially prevents ventilation of the plurality of pipes and thus allows water temperatures in the panel to rise higher than possible in the absence of such cover. The exposure of the opposite ends of the pipes to ambient prevents water temperatures in the panel from exceeding a predetermined temperature.

4 Claims, 3 Drawing Sheets

SOLAR PANEL HAVING POLYCARBONATE SHEET COVERING

BACKGROUND OF THE INVENTION

1. Field of the Invention

This invention relates to solar panels for heating water. More particularly, it relates to a solar panel having a structure that provides hotter water than similar panels but which prevents over-heating.

2. Description of the Prior Art

Conventional solar panels include a collection of parallel pipes having their opposite ends collectively in fluid communication with an inlet manifold and an outlet manifold. The water is heated by solar radiation as it travels through the pipes from the first manifold to the second manifold.

In a simple installation, the pipes are exposed to the ventilating effect of the ambient environment. As a result, the water temperature rarely exceeds one hundred twenty degrees Fahrenheit (120° F.). This may be unacceptably cool for some applications such as cold swimming pools. In such cases, a higher temperature is desirable.

Inventors have therefore applied glazing to the pipes to make them absorb greater amounts of heat.

If a solar panel is made of metallic tubing, the structural integrity of the tubing is substantially unaffected by the elevated water temperatures made possible by glazing, which temperatures may be about one hundred eighty degrees Fahrenheit (180° F.). The water can be dangerously hot if used for a hot water heater, for example.

Where plastic tubing is used, over-heating can be a problem because the water temperature may approach or exceed the degradation temperature of the plastic. Still, plastic tubing is desirable due to its low weight, relatively low cost, elimination of calcification and scaling of the tubes, and high heat transfer efficiency.

Glazing is thus understood as solving the low-temperature problem and creating an over-heating problem.

Another technique for producing hotter water includes covering the pipes with materials that allow solar radiation to pass therethrough but which block air flow over the pipes to prevent cooling by natural ventilation. This solution has the same shortcoming as glazing in that it can produce water that is too hot.

Thus there is a need for a structure that enables a solar panel made of plastic tubing to attain temperatures higher than one hundred twenty degrees Fahrenheit (120° F.), but lower than dangerously hot temperatures, and which protects the plastic tubing from over-heating.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for an improved solar panel having plastic tubing is now met by a new, useful, and non-obvious invention.

The inventive structure is a novel solar panel that includes an inlet manifold and an outlet manifold that is spaced a predetermined distance from the inlet manifold, in parallel relation thereto. A plurality of pipes interconnects the inlet and outlet manifolds. More particularly, each pipe in the plurality of pipes has a first end in open fluid communication with the inlet manifold and a second end in open fluid communication with the outlet manifold.

A box-shaped cover has a length at least slightly less than the predetermined distance between the inlet and outlet manifolds so that opposite ends of the pipes are exposed to ambient. The cover is disposed in surrounding or ensleeving relation to the plurality of pipes.

The cover substantially prevents ventilation of the plurality of pipes and thus allows water temperatures in the panel to rise higher than possible in the absence of such cover. The exposure of the opposite ends of the pipes to ambient prevents water temperatures in the panel from exceeding a predetermined temperature.

The box-shaped cover is made of a double-walled polycarbonate material having ribbing between the walls. It can also be single-walled without ribs.

In one embodiment, the plurality of pipes is grouped into at least two groupings of pipes where a first grouping of pipes is spaced apart from a second grouping of pipes so that a separate cover is provided for each grouping of pipes. However, such grouping is not required.

A guide is disposed transversely to the pipes in surmounting relation thereto for the purpose of maintaining the pipes in their parallel configuration with one another. A plurality of apertures is formed in the guide so that air can flow through the cover along the extent of each pipe.

A primary object of this invention is to provide a solar panel having plastic tubing that provides very hot water yet which is protected from overheating.

A closely related object is to provide such a solar panel in a mechanically simple, reliable, durable, and cost-effective way.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
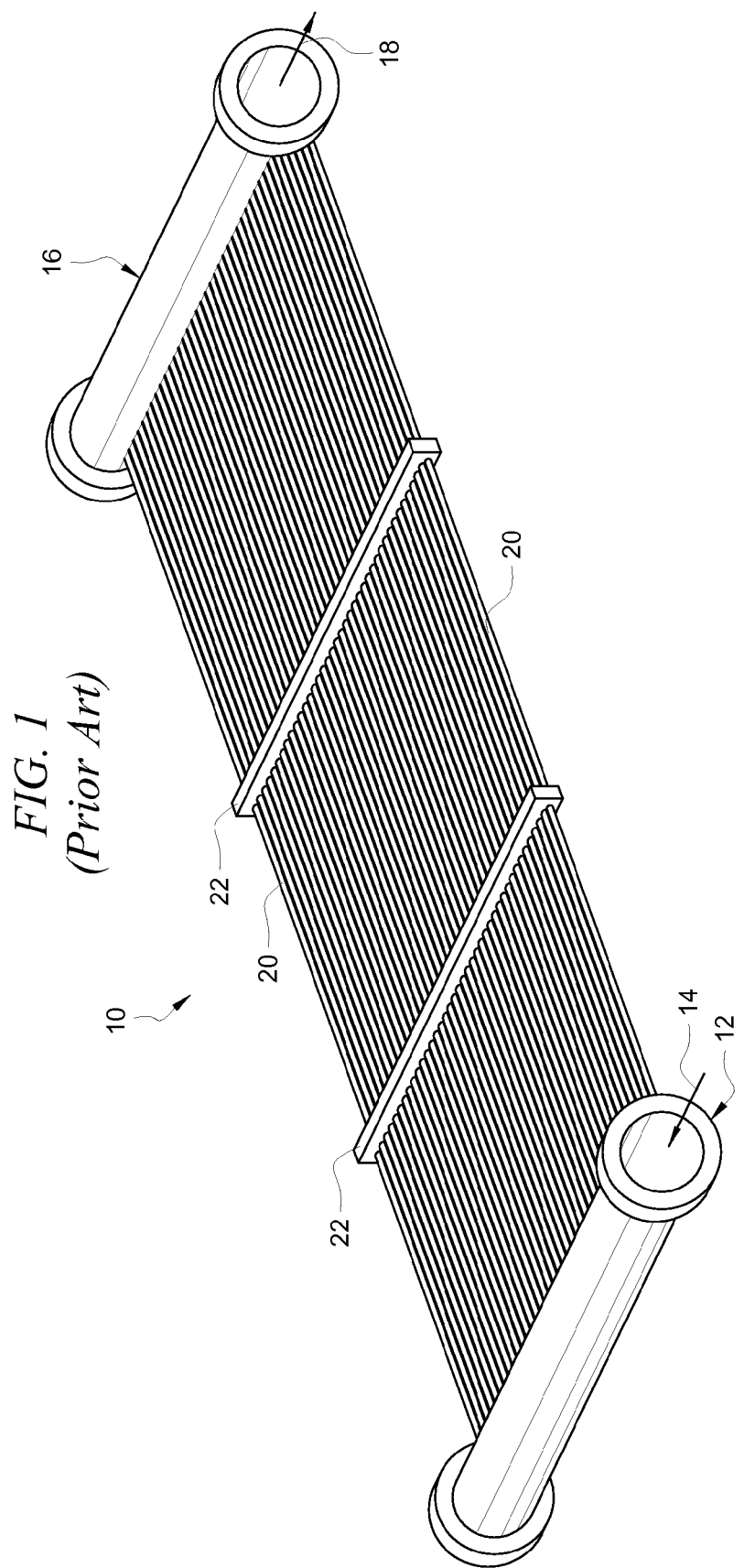
FIG. 1 is a perspective view of a solar panel of the prior art.

Referring now to FIG. 1, there it will be seen that a solar panel of the prior art is denoted as a whole by the reference numeral 10. It includes a first manifold 12 into which cold water enters as indicated by directional arrow 14 and a second manifold 16 from which heated water flows as indicated by directional arrow 18. A plurality of plastic pipes, collectively denoted 20, has a first end in open fluid communication with said first manifold 12 and a second end in open fluid communication with second manifold 16. The length of each pipe 20 thus determines the dwell time of a molecule of water in said pipe and thus is a factor in determining the amount of solar heat transferred into said water molecule.

Guide or holder 22 is employed to maintain pipes 20 in parallel alignment with one another. In this particular embodiment, there are two (2) of such holders, substantially equidistantly spaced from one another and from manifolds 12 and 16. Each guide 22 surmounts pipes 20 and a plurality of arcuate cuts is formed in its bottom edge to accommodate the pipes, there being one arcuate cut to accommodate each pipe. It should be observed that this prior art guide is a solid strip of material.

Pipes 20 are exposed to the ambient environment. Accordingly, natural ventilation will prevent the water heated by said solar panel from being heated above about one hundred twenty degrees Fahrenheit (120° F.). Pipes 20 can be covered with materials that allow solar radiation to pass through to prevent such natural ventilation; the temperature of the water rises when such covering means are used. However, such covers typically cause a spiraling increase in the water temperature with the result that the temperature becomes too high.

Figure 2:
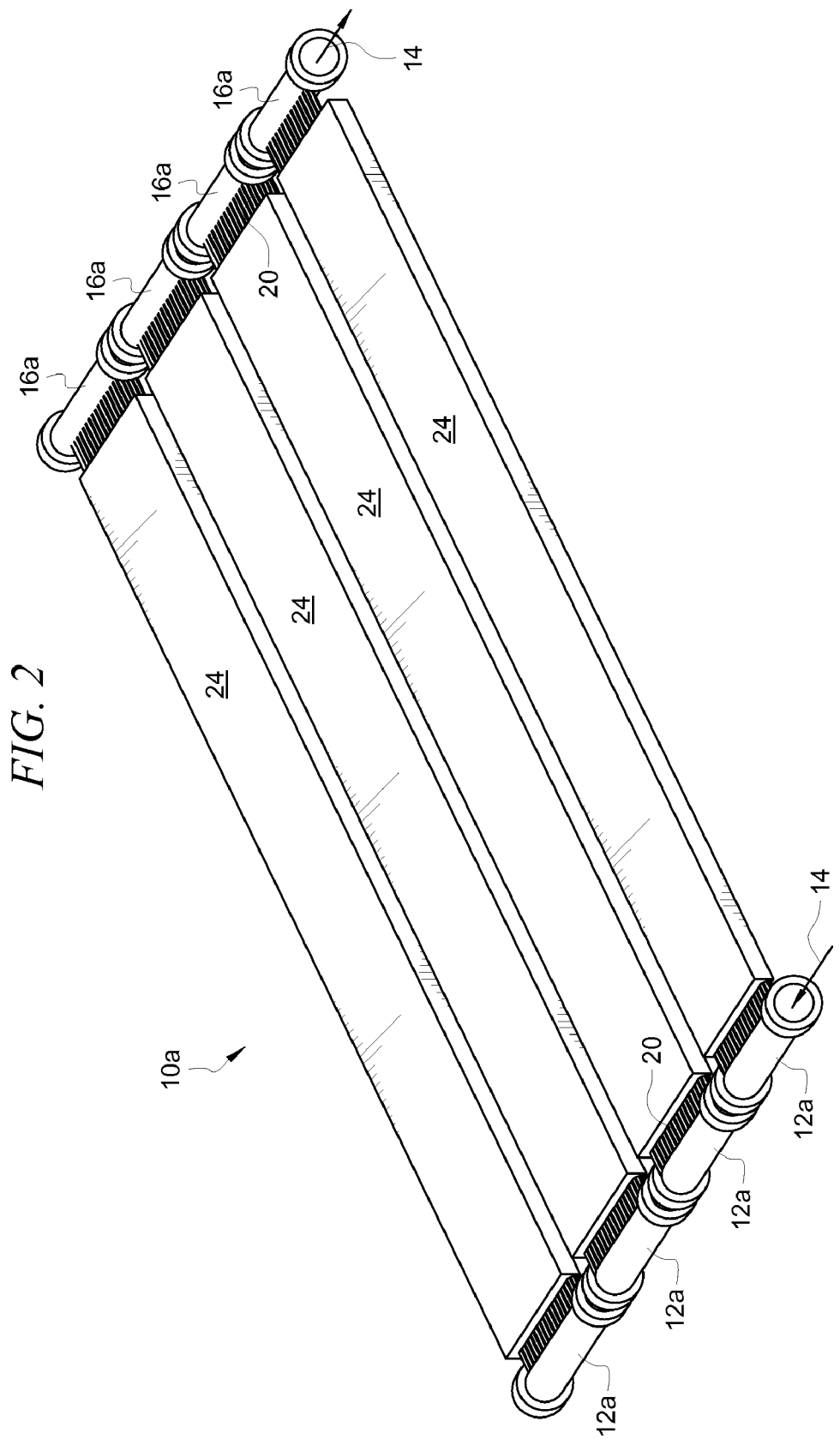
FIG. 2 is a perspective view of the novel solar panel.

Referring now to FIG. 2, it will there be seen that an illustrative embodiment of the invention is denoted as a whole by the reference numeral 10a. Note that this installation includes four (4) of the prior art modules 10 of FIG. 1 with their respective inlet and outlet manifolds disposed in fluid communication with one another.

In a typical installation, there may be a large plurality of pipes 20 disposed in side-by-side relation to one another. In a typical solar panel for heating swimming pool water, for example, there may be thirty nine (39) pipes in each module, each of which is black in color to maximize heat transfer into the water flowing through the panel. If left uncovered, these panels do not reach the requisite water temperature for domestic hot water heating, but if traditional glazing or covering methods are used, the panels get too hot and eventually degrade as a result of the high temperature of the water.

It has been found that pipes 20 are best protected by covering them with light-in-weight polycarbonate multi-wall sheets 24 sold under the trademark Polygal® sheets. The protective cover may be made out of other transparent plastic sheets and can be single walled, but the key is to allow the proper amount of air flow to achieve high temperatures without overheating the panels.

Figure 3A:
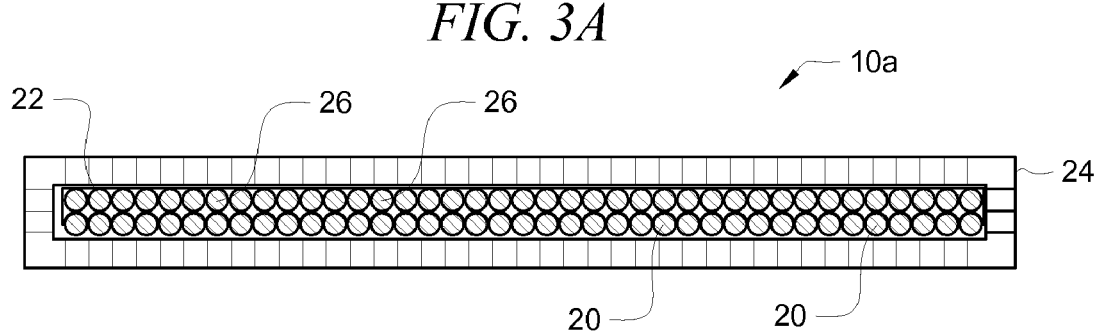
FIG. 3A is a sectional view taken along line 3A-3A in FIG. 2.

A typical multi-wall sheet 24 has two (2) walls that are spaced apart from one another by ribs, much like cardboard, as depicted in FIG. 3A. Where three (3) walls are provided, there are two (2) layers of such ribbing.

Figure 3B:
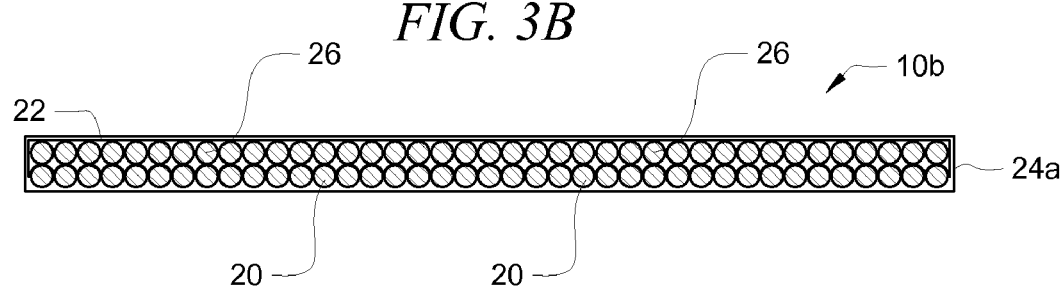
FIG. 3B is a sectional view like that of FIG. 3A but depicting a second embodiment.

A double-wall sheet 24 is depicted in embodiment 10a FIG. 3A and a single-wall sheet 24a is depicted in embodiment 10b of FIG. 3B.

Sheets 24 are one-sixth (⅙) the weight of glass and one-third (⅓) the weight of acrylic. They have an impact strength two hundred (200) times greater than glass and eight (8) times greater than acrylic. They also exhibit excellent weather resistance because a solar grade co-extruded layer protects the sheets against yellowing and surface wear from extended UV exposure. They provide excellent thermal insulation because the ribbed configuration of the multi-walled sheets traps air within the sheet. They are flexible, easy to install, and will not crack or split when cut, sawn, bent into arches, or drilled. They are also flame retardant; at very high temperatures, the material melts but flames do not spread. A UV blocking layer protects objects inside the structure from yellowing and other types of UV damage.

As depicted in the cross-sectional views of FIGS. 3A and 3B, each group of pipes 20 is fully housed by bending each sheet 24 (double-walled) or 24a (single-walled) into a box of parallelepiped structure. This produces four surfaces that are subject to being lifted by wind force, but each surface is relatively small so the lifting forces are not great. Moreover, a smaller box is stronger from a structural standpoint than a large box. In contrast, a single cover placed over all of the pipes of the FIG. 2 embodiment would form one (1) large wing surface that could be lifted in high winds.

Note from an inspection of FIG. 2 that each polycarbonate box is open-ended at the opposite ends of each pipe 20 where said pipes join manifolds 12 and 16. This allows airflow from one end of each pipe 20 to the other because each prior art guide 22 is modified by apertures 26 formed therein along its extent. Said apertures are material savings apertures and they also serve to allow the aforementioned airflow along the length of the pipes. Note further from FIG. 2 that each guide 22 has a flat, straight construction and a length substantially equal to a collective width of the plurality of plastic pipes. Moreover, each aperture 26 is closely spaced relative to its contiguous aperture or apertures to maximize material savings, i.e. to minimize materials used and such maximizing of material savings maximizes air flow through each guide.

The polycarbonate insulator sheets increase the temperature of the water because they create a greenhouse effect around the panel. Without the polycarbonate cover, airflow around the panels limits their temperature to around one hundred twenty degrees Fahrenheit (120° F.) as mentioned earlier. It is important to leave the airflow areas at the top and bottom of the box open to ambient because this ensures that the greenhouse effect will not be so efficient that it causes the water to reach exceedingly hot temperatures, i.e., above one hundred eighty degrees Fahrenheit (180° F.), which degrades the plastic panels.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:
1. A solar panel, comprising:
an inlet manifold;
an outlet manifold spaced a predetermined distance from said inlet manifold;
a plurality of plastic pipes having a first end in open fluid communication with said inlet manifold and a second end in open fluid communication with said outlet manifold;
a box-shaped cover disposed in partially ensleeving relation to said plurality of plastic pipes;
said box-shaped cover having a length less than said predetermined distance between said inlet and outlet manifolds so that opposite ends of pipes in said plurality of plastic pipes are exposed to ambient;
said cover preventing ventilation of said plurality of plastic pipes along an extent of said plastic pipes covered by said cover and enabling water temperatures in said panel to rise higher than possible in the absence of such cover;

said exposure of said opposite ends of said plastic pipes to ambient preventing water temperatures in said panel from exceeding a predetermined temperature;

at least one guide disposed in transverse, surmounting relation to said plurality of plastic pipes;

said at least one guide having a flat, straight construction and a length substantially equal to a collective width of said plurality of plastic pipes;

a plurality of apertures formed in each guide of said at least one guide to enable ambient air to flow along the length of each plastic pipe; and each aperture of said plurality of apertures being disposed in closely spaced relation to a contiguous aperture to minimize an amount of material used to form said at least one guide and to maximize air flow through said plurality of apertures.

2. The solar panel of claim 1, further comprising:
said box-shaped cover being made of a polycarbonate material.

3. The solar panel of claim 2, further comprising:
said box-shaped cover being made of a double-walled polycarbonate material having ribbing between the walls.

4. The solar panel of claim 1, further comprising:
said plurality of plastic pipes being grouped into at least two groupings of plastic pipes where a first grouping of plastic pipes is spaced apart from a second grouping of plastic pipes; and there being a separate cover for each grouping of plastic pipes.

\* \* \* \* \*